(12) United States Patent
Chen et al.

(10) Patent No.: US 10,192,687 B2
(45) Date of Patent: Jan. 29, 2019

(54) CAPACITOR ASSEMBLY HAVING A NON-SYMMETRICAL ELECTRODE STRUCTURE AND CAPACITOR SEAT STRUCTURE THEREOF

(71) Applicant: APAQ TECHNOLOGY CO., LTD., Miaoli County (TW)

(72) Inventors: Ming-Tsung Chen, Changhua County (TW); Hsi-Dung Lin, Taoyuan (TW); Ching-Feng Lin, Hsinchu County (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 0 days.

(21) Appl. No.: 15/644,994

(22) Filed: Jul. 10, 2017

(65) Prior Publication Data
US 2018/0269001 A1 Sep. 20, 2018

(30) Foreign Application Priority Data
Mar. 17, 2017 (TW) .............................. 106203796 U

(51) Int. Cl.
| | | |
|---|---|---|
| *H01G 2/02* | (2006.01) | |
| *H01G 9/08* | (2006.01) | |
| *H01G 9/008* | (2006.01) | |
| *H01G 9/06* | (2006.01) | |
| *H01G 9/15* | (2006.01) | |

(52) U.S. Cl.
CPC .............. *H01G 9/008* (2013.01); *H01G 9/06* (2013.01); *H01G 9/151* (2013.01)

(58) Field of Classification Search
CPC ............... H01G 2/06; H01G 9/06; H01G 9/10
USPC .................................................. 361/513, 515
See application file for complete search history.

(56) References Cited

U.S. PATENT DOCUMENTS

| | | | | |
|---|---|---|---|---|
| 7,453,683 | B2* | 11/2008 | Nakamura ............. | H01G 2/065 361/301.3 |
| 9,779,881 | B2* | 10/2017 | Ishimaru ................ | H01G 9/151 |
| 2010/0172068 | A1* | 7/2010 | Yoshimitsu .......... | H01G 9/0036 361/525 |
| 2011/0235238 | A1* | 9/2011 | Kawakubo ............. | H01G 9/008 361/500 |

FOREIGN PATENT DOCUMENTS

JP          2000315626 A    * 11/2000

* cited by examiner

*Primary Examiner* — Eric Thomas
(74) *Attorney, Agent, or Firm* — Li & Cai Intellectual Property (USA) Office

(57) ABSTRACT

The present disclosure provides a capacitor assembly having a non-symmetrical electrode structure and a capacitor seat structure thereof. The capacitor assembly includes a capacitor seat structure and a capacitor package structure. The capacitor seat structure includes a capacitor seat, a first electrode layer and a second electrode layer. The capacitor seat has a first through hole, a first groove, a second through hole and a second groove. The capacitor package structure includes a first conductive pin and a second conductive pin. The first conductive pin passes through the first through hole and is disposed inside the first groove to electrically contact the first electrode layer. The second conductive pin passes through the second through hole and is disposed inside the second groove to electrically contact the second electrode layer.

10 Claims, 7 Drawing Sheets

CAPACITOR ASSEMBLY HAVING A NON-SYMMETRICAL ELECTRODE STRUCTURE AND CAPACITOR SEAT STRUCTURE THEREOF

BACKGROUND OF THE INVENTION

1. Field of the Invention

The instant disclosure relates to a capacitor assembly and a capacitor seat structure thereof, and more particularly to a capacitor assembly having a non-symmetrical electrode structure and a capacitor seat structure thereof.

2. Description of Related Art

The wound (winding-type) capacitor includes a capacitor core, a casing, and a sealing cover. The capacitor core has an anode foil coupled to an anode terminal, a cathode foil coupled to a cathode terminal, a separator, and an electrolyte layer. The anode foil, the cathode foil and the separator are rolled together. The separator is disposed between the anode foil and the cathode foil. The electrolyte layer is formed between the anode foil and the cathode foil. The casing has an opening for receiving the capacitor core. The sealing cover can used to seal the casing, and the anode terminal and the cathode terminal can pass through a through hole of the sealing cover. A given space is provided between the sealing cover and the capacitor core. A stopper for securing the space is provided on at least one of the anode terminal and the cathode terminal.

SUMMARY OF THE INVENTION

One aspect of the instant disclosure relates to a capacitor assembly having a non-symmetrical electrode structure and a capacitor seat structure thereof.

One of the embodiments of the instant disclosure provides a capacitor assembly having a non-symmetrical electrode structure, comprising a capacitor seat structure and a capacitor package structure. The capacitor seat structure includes a capacitor seat, a first electrode layer and a second electrode layer. The first electrode layer and the second electrode layer are disposed on a bottom side of the capacitor seat and separated from each other, and the capacitor seat has a first through hole, a first groove communicated with the first through hole, a second through hole separated from the first through hole, and a second groove communicated with the second through hole. The capacitor package structure is disposed on the capacitor seat structure. The capacitor package structure includes a wound capacitor, a package casing for enclosing the wound capacitor, a first conductive pin electrically contacting the wound capacitor and partially exposed from the package casing, and a second conductive pin electrically contacting the wound capacitor and partially exposed from the package casing. The first electrode layer is partially received inside the first groove, and the first conductive pin has a first through portion passing through the first through hole and a first bending portion disposed inside the first groove and electrically contacting the first electrode layer. The second electrode layer is partially received inside the second groove, and the second conductive pin has a second through portion passing through the second through hole and a second bending portion disposed inside the second groove and electrically contacting the second electrode layer. The first electrode layer and the second electrode layer have the same or different surface areas.

Another one of the embodiments of the instant disclosure provides a capacitor assembly having a non-symmetrical electrode structure, comprising a capacitor seat structure and a capacitor package structure. The capacitor seat structure includes a capacitor seat, a first electrode layer and a second electrode layer. The first electrode layer and the second electrode layer are disposed on a bottom side of the capacitor seat and separated from each other, and the capacitor seat has a first through hole, a first groove communicated with the first through hole, a second through hole separated from the first through hole, and a second groove communicated with the second through hole. The capacitor package structure is disposed on the capacitor seat structure, and the capacitor package structure includes a first conductive pin and a second conductive pin. The first electrode layer is partially received inside the first groove, and the first conductive pin passes through the first through hole and is disposed inside the first groove to electrically contact the first electrode layer. The second electrode layer is partially received inside the second groove, and the second conductive pin passes through the second through hole and is disposed inside the second groove to electrically contact the second electrode layer. The first electrode layer and the second electrode layer have the same or different surface areas.

Yet another one of the embodiments of the instant disclosure provides a capacitor seat structure having a non-symmetrical electrode structure, comprising a capacitor seat, a first electrode layer and a second electrode layer. The first electrode layer and the second electrode layer are disposed on a bottom side of the capacitor seat and separated from each other, and the capacitor seat has a first through hole, a first groove communicated with the first through hole, a second through hole separated from the first through hole, and a second groove communicated with the second through hole. The first electrode layer is partially received inside the first groove, the second electrode layer is partially received inside the second groove, and the first electrode layer and the second electrode layer have the same or different surface areas.

Therefore, the first conductive pin can pass through the first through hole and can be disposed inside the first groove to electrically contact the first electrode layer, and the second conductive pin can pass through the second through hole and can be disposed inside the second groove to electrically contact the second electrode layer due to the features of "the capacitor seat having a first through hole, a first groove communicated with the first through hole, a second through hole separated from the first through hole, and a second groove communicated with the second through hole" and "the first electrode layer being partially received inside the first groove, and the second electrode layer being partially received inside the second groove".

To further understand the techniques, means and effects of the instant disclosure applied for achieving the prescribed objectives, the following detailed descriptions and appended drawings are hereby referred to, such that, and through which, the purposes, features and aspects of the instant disclosure can be thoroughly and concretely appreciated. However, the appended drawings are provided solely for reference and illustration, without any intention to limit the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DETAILED DESCRIPTION OF THE PREFERRED EMBODIMENTS

Figure 1:
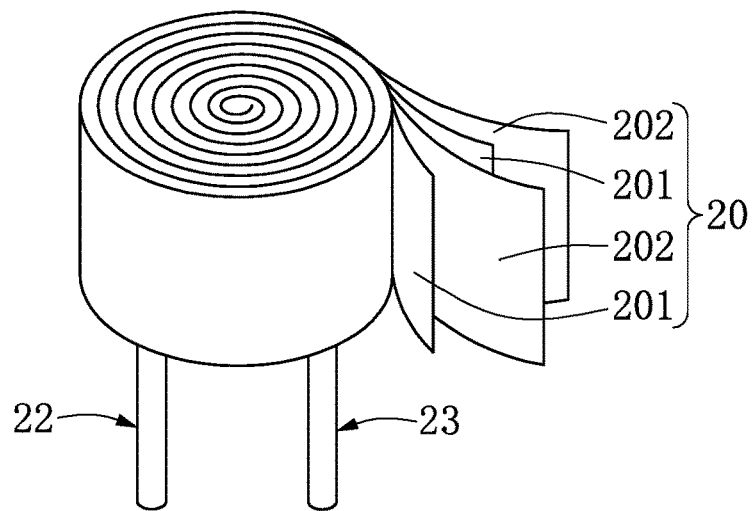
FIG. 1 shows a perspective schematic view of the wound capacitor, the first conductive pin, and the second conductive pin mated with each other according to the first embodiment of the instant disclosure.

The embodiments of "a capacitor assembly having a non-symmetrical electrode structure and a capacitor seat structure thereof" of the instant disclosure are described. Other advantages and objectives of the instant disclosure can be easily understood by one skilled in the art from the disclosure. The instant disclosure can be applied in different embodiments. Various modifications and variations can be made to various details in the description for different applications without departing from the scope of the instant disclosure. The drawings of the instant disclosure are provided only for simple illustrations, but are not drawn to scale and do not reflect the actual relative dimensions. The following embodiments are provided to describe in detail the concept of the instant disclosure, and are not intended to limit the scope thereof in any way.

First Embodiment

Referring to FIG. 1 to FIG. 7, the first embodiment of the present disclosure provides a capacitor assembly S having a non-symmetrical electrode structure, comprising a capacitor seat structure 1 and a capacitor package structure 2 disposed on the capacitor seat structure 1.

First, referring to FIG. 1 to FIG. 4, the capacitor seat structure 1 includes a capacitor seat 10, a first electrode layer 11 and a second electrode layer 12, and the first electrode layer 11 and the second electrode layer 12 have substantially the same or different surface areas. For example, the first electrode layer 11 and the second electrode layer 12 can be made of any conductive material. In addition, the capacitor package structure 2 includes a wound capacitor 20, a package casing 21 for totally enclosing the wound capacitor 20, a first conductive pin 22 electrically contacting the wound capacitor 20 and partially exposed from the package casing 21, and a second conductive pin 23 electrically contacting the wound capacitor 20 and partially exposed from the package casing 21.

Figure 2:
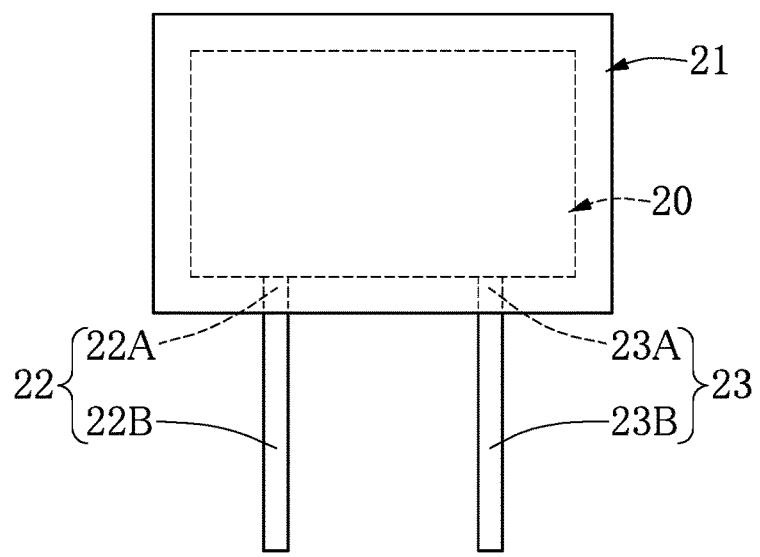
FIG. 2 shows a lateral schematic view of the capacitor package structure according to the first embodiment of the instant disclosure.
Figure 3:
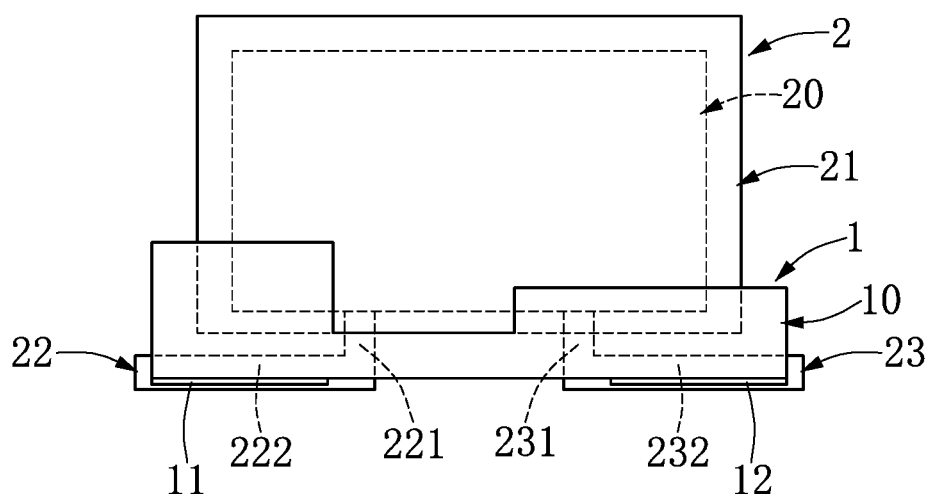
FIG. 3 shows a lateral schematic view of the capacitor assembly according to the first embodiment of the instant disclosure.
Figure 4:
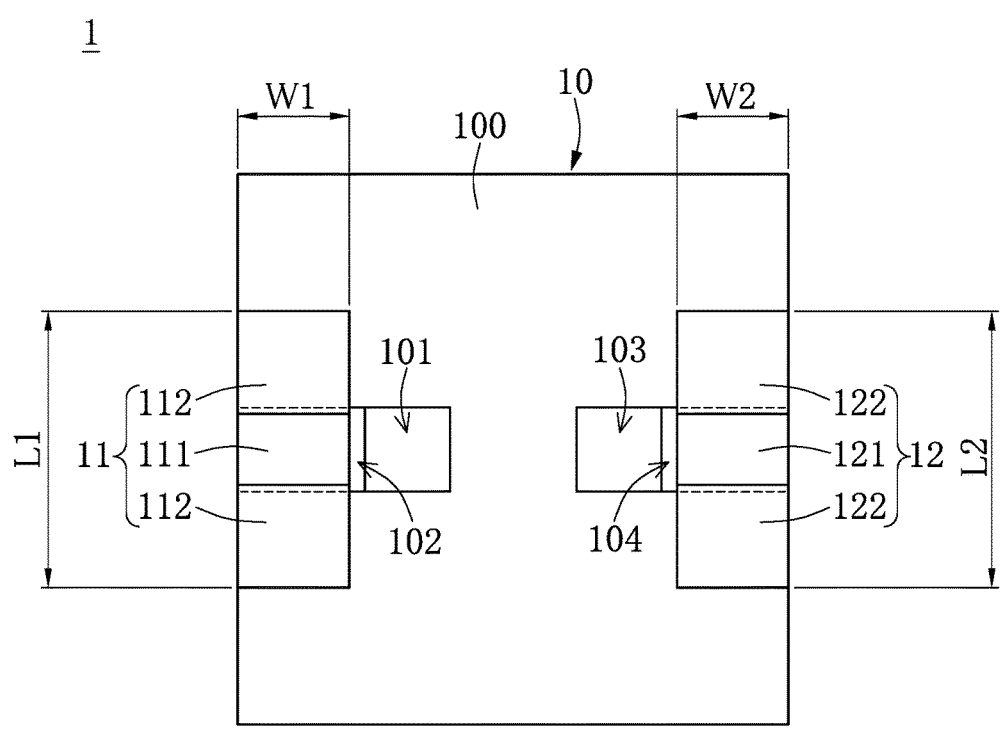
FIG. 4 shows a top schematic view of the capacitor seat structure according to the first embodiment of the instant disclosure.
Figure 5:
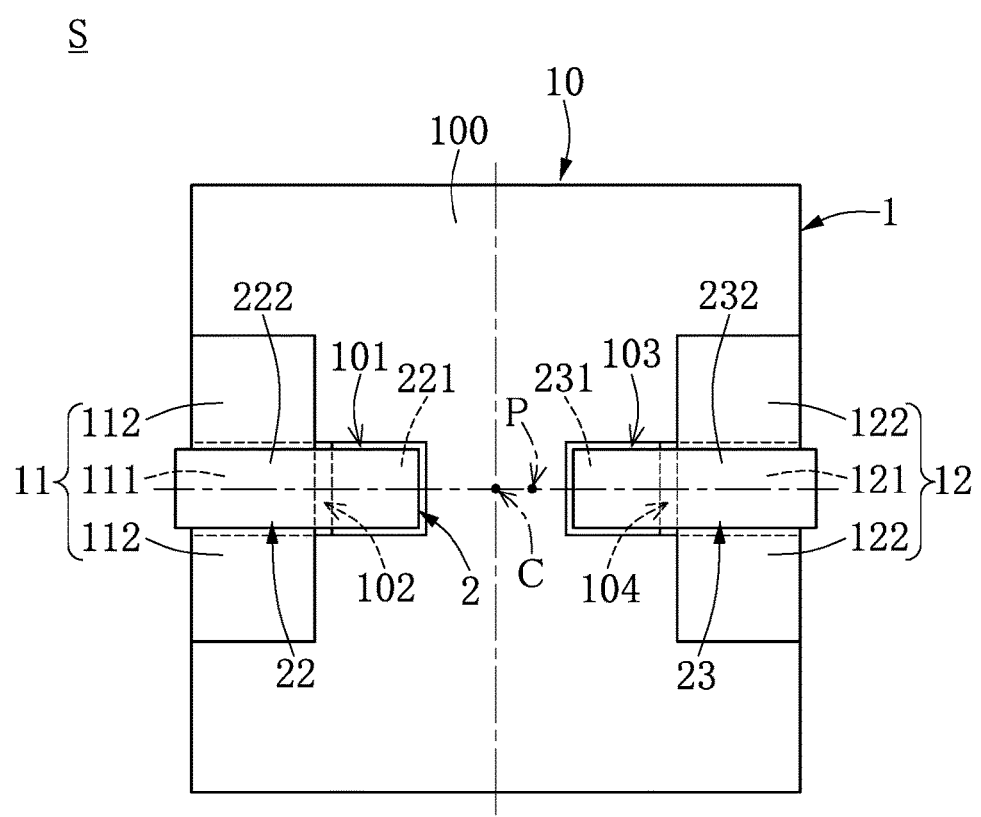
FIG. 5 shows a top schematic view of the capacitor assembly according to the first embodiment of the instant disclosure.
Figure 6:
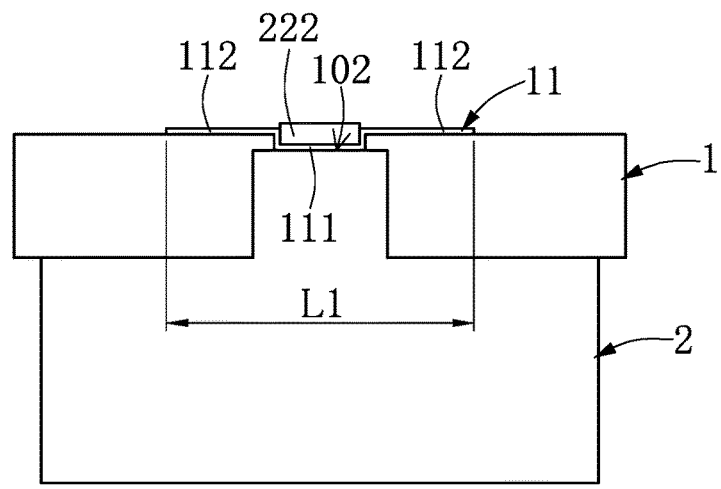
FIG. 6 shows another lateral schematic view of the capacitor assembly according to the first embodiment of the instant disclosure.
Figure 7:
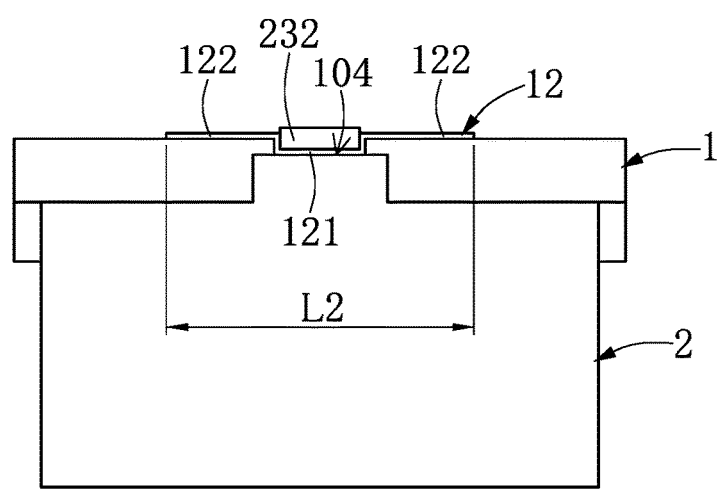
FIG. 7 shows yet another lateral schematic view of the capacitor assembly according to the first embodiment of the instant disclosure.

More particularly, referring to FIG. 1 and FIG. 2, the wound capacitor 20 includes two electrode foils 201 and two separator papers 202. One of the two separator papers 202 is disposed between the two electrode foils 201, and the two electrode foils 201 respectively are a positive foil and a negative foil. In addition, the first conductive pin 22 has a first embedded portion 22A electrically contacting one of the two electrode foils 201 and encapsulated by the package casing 21 and a first exposed portion 22B passing through the package casing 21 and exposed out of the package casing 21. The second conductive pin 23 has a second embedded portion 23A electrically contacting another one of the two electrode foils 201 and encapsulated by the package casing 21 and a second exposed portion 23B passing through the package casing 21 and exposed out of the package casing 21.

Moreover, referring to FIG. 4 to FIG. 7, the first electrode layer 11 and the second electrode layer 12 are disposed on a bottom side 100 of the capacitor seat 10 (such as a seat plate) and separated from each other. The capacitor seat 10 has a first through hole 101, a first groove 102 communicated with the first through hole 101, a second through hole 103 separated from the first through hole 101, and a second groove 104 communicated with the second through hole 103. In addition, the first electrode layer 11 has a first contacting portion 111 disposed on an inner surface of the first groove 102 and a first soldering portion 112 connected to the first contacting portion 111 and disposed on the bottom side 100 of the capacitor seat 10. Furthermore, the second electrode layer 12 has a second contacting portion 121 disposed on an inner surface of the second groove 104 and a second soldering portion 122 connected to the second contacting portion 121 and disposed on the bottom side 100 of the capacitor seat 10. For example, the first soldering portion 112 can be divided into two first portions separated from each other, and the second soldering portion 122 can be divided into two second portions separated from each other.

More particularly, referring to FIG. 3 and FIG. 5 to FIG. 7, the first electrode layer 11 is partially received inside the first groove 102, and the first conductive pin 22 has a first through portion 221 passing through the first through hole 101 and a first bending portion 222 disposed inside the first groove 102 and electrically contacting the first electrode layer 111 of the first electrode layer 11. That is to say, the first conductive pin 22 can pass through the first through hole 101 and can be disposed inside the first groove 102 to electrically contact the first electrode layer 11. In addition, the second electrode layer 12 is partially received inside the second groove 104, and the second conductive pin 23 has a second through portion 231 passing through the second through hole 103 and a second bending portion 232 disposed inside the second groove 104 and electrically contacting the second electrode layer 12. That is to say, the second conductive pin 23 can pass through the second through hole 103 and can be disposed inside the second groove 104 to electrically contact the second electrode layer 12.

It should be noted that the capacitor seat 10 may be a non-symmetrical electrode structure body, so that a geometric center P of the capacitor seat 10 is off-center at a geometric center C of the capacitor assembly S. More particularly, a first surface area (i.e., the width W1 multiplied by the length L1) of the first electrode layer 11 is larger than a second surface area (i.e., the width W2 multiplied by the length L2) of the second electrode layer 12, and the second electrode layer 12 (i.e., a light electrode layer) is closer to a geometric center P of the capacitor seat 10 than the first electrode layer 11 (i.e., a heavy electrode layer) is, so that a geometric center (not shown) of the capacitor seat structure 1 can be adjusted to be the same or similar to the geometric center C of the capacitor assembly S when the geometric center C of the capacitor assembly S is a center position of the capacitor assembly S. That is to say, the stationarity of the capacitor seat structure 1 and the capacitor assembly S using the capacitor seat structure 1 can be increased due to the first surface area and the position of the first electrode layer 11 and the second surface area and the position of the second electrode layer 12.

According to the above description, when the first electrode layer 11 and the second electrode layer 12 have the same surface area and the distance from the first electrode layer 11 to the geometric center P is different from the distance from the second electrode layer 12 to the geometric center P (for example, the second electrode layer 12 is closer to a geometric center P of the capacitor seat 10 than the first electrode layer 11 is), a geometric center (not shown) of the capacitor seat structure 1 can be adjusted to be the same or similar to the geometric center C of the capacitor assembly S so as to increase the stationarity of the capacitor seat structure 1 and the capacitor assembly S using the capacitor seat structure 1.

Second Embodiment

Figure 8:
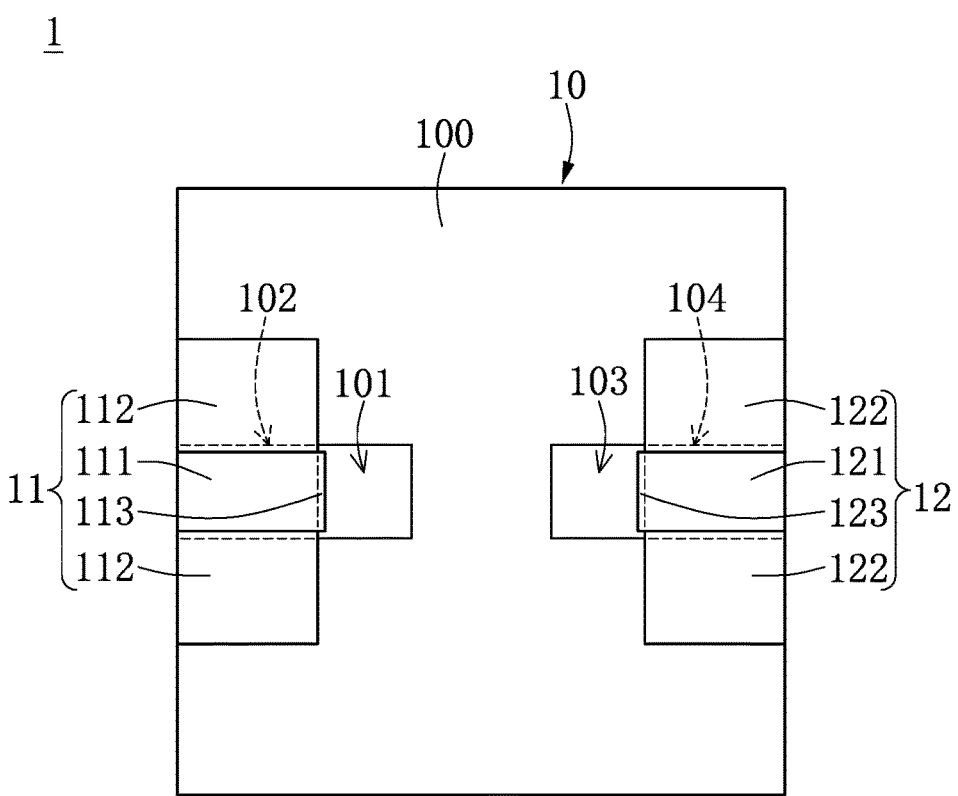
FIG. 8 shows a top schematic view of the capacitor seat structure according to the second embodiment of the instant disclosure.

Referring to FIG. 8, the second embodiment of the present disclosure provides a capacitor assembly (not shown) having a non-symmetrical electrode structure, comprising a capacitor seat structure 1 and a capacitor package structure (not shown). As compared with FIG. 8 and FIG. 4, the difference between the second embodiment and the first embodiment is as follows.

In the second embodiment, the first electrode layer 11 has a first contacting portion 111 disposed on an inner surface of the first groove 102, a first soldering portion 112 connected to the first contacting portion 111 and disposed on the bottom side 100 of the capacitor seat 10, and a first extending portion 113 connected to the first contacting portion 111 and disposed on an inner surface of the first through hole 101. In addition, the second electrode layer 12 has a second contacting portion 121 disposed on an inner surface of the second groove 104, a second soldering portion 122 connected to the second contacting portion 121 and disposed on the bottom side 100 of the capacitor seat 10, and a second extending portion 123 connected to the second contacting portion 121 and disposed on an inner surface of the second through hole 103. For example, the first soldering portion 112 can be divided into two first portions separated from each other, and the second soldering portion 122 can be divided into two second portions separated from each other.

Third Embodiment

Figure 9:
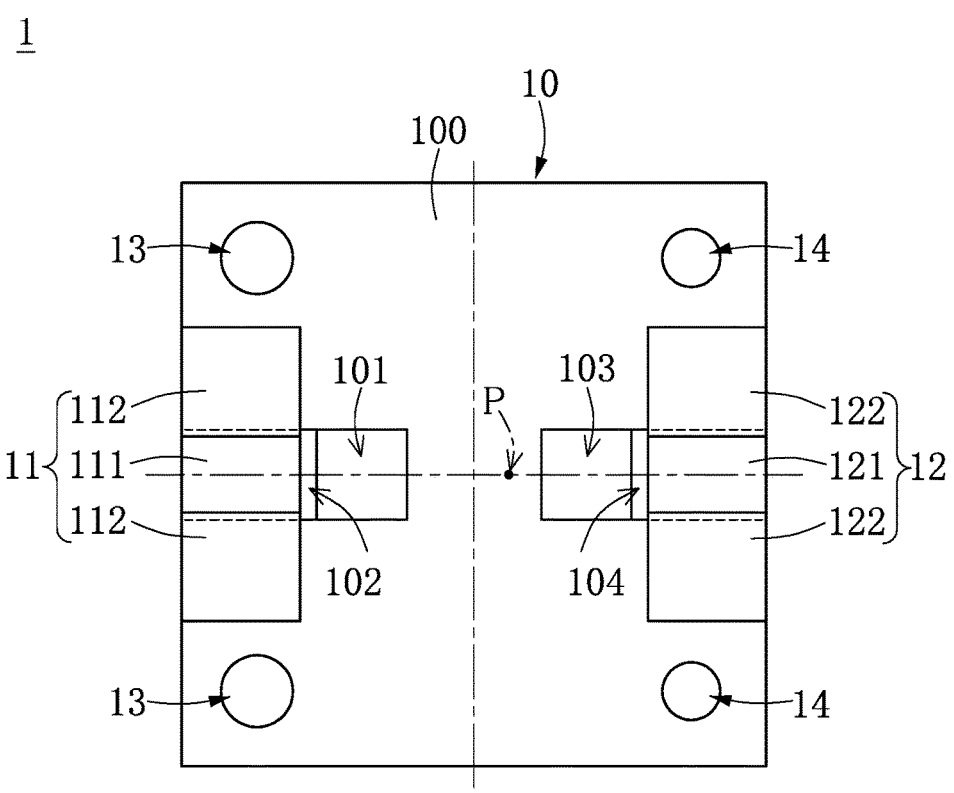
FIG. 9 shows a top schematic view of the capacitor seat structure according to the third embodiment of the instant disclosure.

Referring to FIG. 9, the third embodiment of the present disclosure provides a capacitor assembly (not shown) having a non-symmetrical electrode structure, comprising a capacitor seat structure 1 and a capacitor package structure (not shown). As compared with FIG. 9 and FIG. 4, the difference between the third embodiment and the first embodiment is as follows.

In the third embodiment, the capacitor seat structure 1 includes at least one or more first weight pads 13 disposed on the bottom side 100 of the capacitor seat 10, and at least one or more second weight pads 14 disposed on the bottom side 100 of the capacitor seat 10. In addition, a first surface area of the first weight pad 13 is larger than a second surface area of the second weight pad 14, and the second weight space 14 (i.e., a light weight space) is closer to a geometric center P of the capacitor seat 10 than the first weight pad 13 (i.e., a heavy weight pad) is.

In conclusion, the capacitor seat 10 has a first through hole 101, a first groove 102 communicated with the first through hole 101, a second through hole 103 separated from the first through hole 101, and a second groove 104 communicated with the second through hole 103, the first electrode layer 11 is partially received inside the first groove 102, and the second electrode layer 12 is partially received inside the second groove 104, so that the first conductive pin 22 can pass through the first through hole 101 and can be disposed inside the first groove 102 to electrically contact the first electrode layer 11, and the second conductive pin 23 can pass through the second through hole 103 and can be disposed inside the second groove 104 to electrically contact the second electrode layer 12.

More particularly, when the first electrode layer 11 and the second electrode layer 12 have the same surface area and the distance from the first electrode layer 11 to the geometric center P is different from the distance from the second electrode layer 12 to the geometric center P (for example, the second electrode layer 12 is closer to a geometric center P of the capacitor seat 10 than the first electrode layer 11 is), a geometric center (not shown) of the capacitor seat structure 1 can be adjusted to be the same or similar to the geometric center C of the capacitor assembly S so as to increase the stationarity of the capacitor seat structure 1 and the capacitor assembly S using the capacitor seat structure 1.

The aforementioned descriptions merely represent the preferred embodiments of the instant disclosure, without any intention to limit the scope of the instant disclosure which is fully described only within the following claims. Various equivalent changes, alterations or modifications based on the claims of the instant disclosure are all, consequently, viewed as being embraced by the scope of the instant disclosure.

What is claimed is:

1. A capacitor assembly having a non-symmetrical electrode structure, comprising:
   a capacitor seat structure including a capacitor seat, a first electrode layer and a second electrode layer, wherein the first electrode layer and the second electrode layer are disposed on a bottom side of the capacitor seat and separated from each other, and the capacitor seat has a first through hole, a first groove communicated with the first through hole, a second through hole separated from the first through hole, and a second groove communicated with the second through hole; and
   a capacitor package structure disposed on the capacitor seat structure, wherein the capacitor package structure includes a wound capacitor, a package casing for enclosing the wound capacitor, a first conductive pin electrically contacting the wound capacitor and partially exposed from the package casing, and a second conductive pin electrically contacting the wound capacitor and partially exposed from the package casing;
   wherein the first electrode layer is partially received inside the first groove, and the first conductive pin has a first through portion passing through the first through hole and a first bending portion disposed inside the first groove and electrically contacting the first electrode layer;

wherein the second electrode layer is partially received inside the second groove, and the second conductive pin has a second through portion passing through the second through hole and a second bending portion disposed inside the second groove and electrically contacting the second electrode layer;

wherein the first electrode layer and the second electrode layer have the same or different surface areas; and wherein the capacitor seat is a non-symmetrical electrode structure body, a first surface area of the first electrode layer is larger than a second surface area of the second electrode layer, and the second electrode layer is closer to a geometric center of the capacitor seat than the first electrode layer is.

2. The capacitor assembly of claim 1, wherein the wound capacitor includes two electrode foils and two separator papers, one of the two separator papers is disposed between the two electrode foils, and the two electrode foils respectively are a positive foil and a negative foil, wherein the first conductive pin has a first embedded portion electrically contacting one of the two electrode foils and encapsulated by the package casing and a first exposed portion passing through the package casing and exposed out of the package casing, and the second conductive pin has a second embedded portion electrically contacting another one of the two electrode foils and encapsulated by the package casing and a second exposed portion passing through the package casing and exposed out of the package casing, wherein the capacitor seat structure includes at least one first weight pad and at least one second weight pad both disposed on the bottom side of the capacitor seat, a first surface area of the at least one first weight pad is larger than a second surface area of the at least one second weight pad, and the at least one second weight space is closer to a geometric center of the capacitor seat than the at least one first weight pad is.

3. The capacitor assembly of claim 1, wherein the first electrode layer has a first contacting portion disposed on an inner surface of the first groove and a first soldering portion connected to the first contacting portion and disposed on the bottom side of the capacitor seat, and the second electrode layer has a second contacting portion disposed on an inner surface of the second groove and a second soldering portion connected to the second contacting portion and disposed on the bottom side of the capacitor seat.

4. The capacitor assembly of claim 1, wherein the first electrode layer has a first contacting portion disposed on an inner surface of the first groove, a first soldering portion connected to the first contacting portion and disposed on the bottom side of the capacitor seat, and a first extending portion connected to the first contacting portion and disposed on an inner surface of the first through hole, wherein the second electrode layer has a second contacting portion disposed on an inner surface of the second groove, a second soldering portion connected to the second contacting portion and disposed on the bottom side of the capacitor seat, and a second extending portion connected to the second contacting portion and disposed on an inner surface of the second through hole.

5. A capacitor assembly having a non-symmetrical electrode structure, comprising:
a capacitor seat structure including a capacitor seat, a first electrode layer and a second electrode layer, wherein the first electrode layer and the second electrode layer are disposed on a bottom side of the capacitor seat and separated from each other, and the capacitor seat has a first through hole, a first groove communicated with the first through hole, a second through hole separated from the first through hole, and a second groove communicated with the second through hole; and a capacitor package structure disposed on the capacitor seat structure, wherein the capacitor package structure includes a first conductive pin and a second conductive pin;

wherein the first electrode layer is partially received inside the first groove, and the first conductive pin passes through the first through hole and is disposed inside the first groove to electrically contact the first electrode layer;

wherein the second electrode layer is partially received inside the second groove, and the second conductive pin passes through the second through hole and is disposed inside the second groove to electrically contact the second electrode layer;

wherein the first electrode layer and the second electrode layer have the same or different surface areas; and wherein the capacitor seat is a non-symmetrical electrode structure body, a first surface area of the first electrode layer is larger than a second surface area of the second electrode layer, and the second electrode layer is closer to a geometric center of the capacitor seat than the first electrode layer is.

6. The capacitor assembly of claim 5, wherein the first electrode layer has a first contacting portion disposed on an inner surface of the first groove and a first soldering portion connected to the first contacting portion and disposed on the bottom side of the capacitor seat, and the second electrode layer has a second contacting portion disposed on an inner surface of the second groove and a second soldering portion connected to the second contacting portion and disposed on the bottom side of the capacitor seat.

7. The capacitor assembly of claim 5, wherein the first electrode layer has a first contacting portion disposed on an inner surface of the first groove, a first soldering portion connected to the first contacting portion and disposed on the bottom side of the capacitor seat, and a first extending portion connected to the first contacting portion and disposed on an inner surface of the first through hole, wherein the second electrode layer has a second contacting portion disposed on an inner surface of the second groove, a second soldering portion connected to the second contacting portion and disposed on the bottom side of the capacitor seat, and a second extending portion connected to the second contacting portion and disposed on an inner surface of the second through hole.

8. A capacitor seat structure having a non-symmetrical electrode structure, comprising:
a capacitor seat;
a first electrode layer; and
a second electrode layer;
wherein the first electrode layer and the second electrode layer are disposed on a bottom side of the capacitor seat and separated from each other, and the capacitor seat has a first through hole, a first groove communicated with the first through hole, a second through hole separated from the first through hole, and a second groove communicated with the second through hole;

wherein the first electrode layer is partially received inside the first groove, the second electrode layer is partially received inside the second groove, and the first electrode layer and the second electrode layer have the same or different surface areas; and wherein the capacitor seat is a non-symmetrical electrode structure body, a first surface area of the first electrode layer is larger than a second surface area of the second electrode layer, and the second electrode layer is closer to a geometric center of the capacitor seat than the first electrode layer is.

9. The capacitor seat structure of claim 8, wherein the first electrode layer has a first contacting portion disposed on an inner surface of the first groove and a first soldering portion connected to the first contacting portion and disposed on the bottom side of the capacitor seat, and the second electrode layer has a second contacting portion disposed on an inner surface of the second groove and a second soldering portion connected to the second contacting portion and disposed on the bottom side of the capacitor seat.

10. The capacitor seat structure of claim 8, wherein the first electrode layer has a first contacting portion disposed on an inner surface of the first groove, a first soldering portion connected to the first contacting portion and disposed on the bottom side of the capacitor seat, and a first extending portion connected to the first contacting portion and disposed on an inner surface of the first through hole, wherein the second electrode layer has a second contacting portion disposed on an inner surface of the second groove, a second soldering portion connected to the second contacting portion and disposed on the bottom side of the capacitor seat, and a second extending portion connected to the second contacting portion and disposed on an inner surface of the second through hole.

* * * * *